United States Patent [19]

Park

[11] Patent Number: 5,440,674
[45] Date of Patent: Aug. 8, 1995

[54] MESH GENERATION WITH QUASI-EQUILATERAL TRIANGULATION FOR FINITE ELEMENT ANALYSES

[76] Inventor: Joon Y. Park, Socha-Gu Bangbae-Dong Joong-Ang Apt Ga-1101, Seoul, Rep. of Korea

[21] Appl. No.: 738,796

[22] Filed: Jul. 31, 1991

[51] Int. Cl.$^6$ .............................................. G06T 17/20
[52] U.S. Cl. ...................................... 395/123; 395/120
[58] Field of Search ............... 395/119, 120, 123, 127, 395/129, 130, 141, 143

[56] References Cited

U.S. PATENT DOCUMENTS 4,912,664  3/1990  Weiss et al. ...................... 395/141 X

OTHER PUBLICATIONS

L. Paul Chew, "Guaranteed Quality Triangular Meshes", Dept. of Computer Science, Cornell University, Ithaca, N.Y., TR 89–983 (1989).

*Primary Examiner*—Almis R. Jankus
*Attorney, Agent, or Firm*—James M. Deimen

[57] ABSTRACT

New algorithms for automatically generating two-dimensional uniform and graded finite element meshes incorporate novel operators for the generation of nodes on an object's boundaries as well as interior. The algorithms begin with an initial triangulation of the object. The generation of additional nodes is used to generate a triangular mesh with the desired density. Most importantly, the algorithms guarantee a lower bound on the smallest angle in the whole mesh. This lower bound is 30°. With this guaranteed lower bound, smoothing of the mesh or human intervention to improve the shape of the mesh becomes unnecessary.

11 Claims, 7 Drawing Sheets

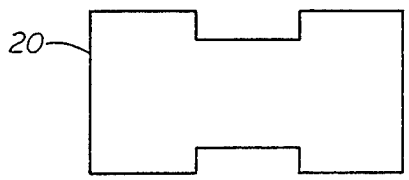
FIG 1a
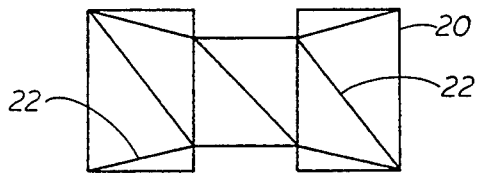
FIG 1b
FIG 2
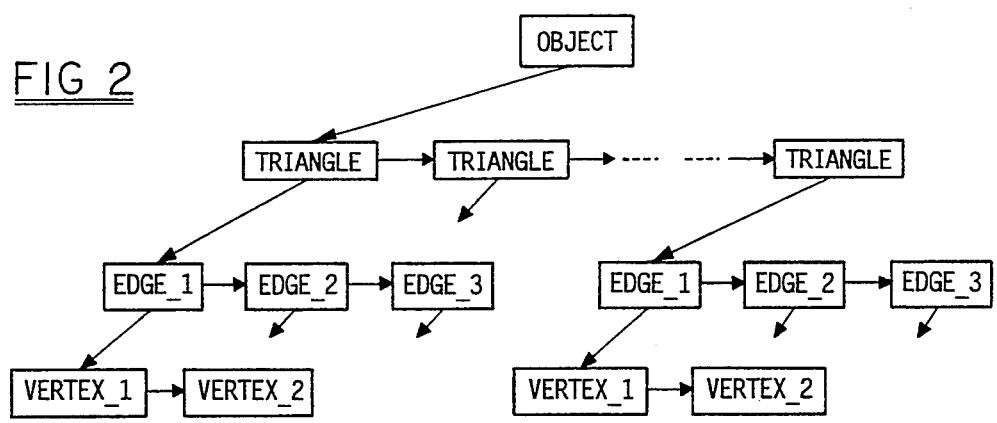
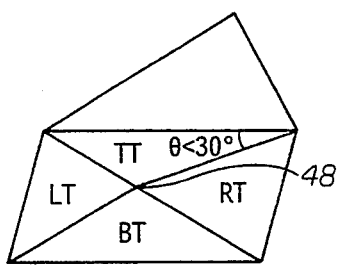
FIG 7a
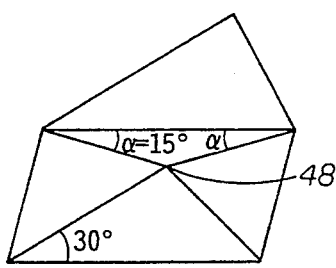
FIG 7b
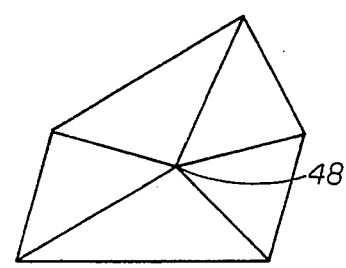
FIG 7c
FIG 8
| OPERATORS<br>OPERANDS | NE<br>(NODE_ON_EDGE) | NI<br>(NODE_IN_INTERIOR) | ES<br>(EDGE_SWAPPING) | NR<br>(NODE_RELOCATION) |
|---|---|---|---|---|
| NODES | + 1 (B) | + 1 (I) | 0 | 0 |
| EDGES | + 1 (B)<br>+ 1 (I) | + 3 (I) | 0 | 0 |
| ELEMENTS | + 1 (B) | + 2 (I) | 0 | 0 |
B: BOUNDARY
I: INTERIOR

FIG 9

```
PROGRAM UNIFORM_MESH_IN_2D;
{* GENERATES A UNIFORM MESH WITH A USER SPECIFIED ELEMENT
SIZE FROM AN INITIAL TRIANGULATION OF THE OBJECT.
ELEMENT SIZE IS DEFINED BY A USER SPECIFIED EDGE LENGTH.
* }
BEGIN
    SORT EDGES IN THE CURRENT DATA STRUCTURE;
    IF (LENGTH OF LE) < (LENGTH OF PRE-DEFINED EDGE) THEN
        EXIT
    ELSE IF LE = BE THEN
    BEGIN
        APPLY NE;
        UPDATE_DATA_STRUCTURE;
        UNIFORM_MESH_IN_2D;
    END
    ELSE IF LE = IE THEN
    BEGIN
        FIND QUAD DEFINED BY LE;
        IF PRE-CONDITION OF ES = TRUE THEN
        BEGIN
            APPLY ES
            UPDATE_DATA_STRUCTURE;
        END
        ELSE BEGIN
            FIND PCP USING NI;
            IF SMALLEST ANGLE IN THE QUAD IS ENLARGED OR ≥30° THEN
                UNIFORM_MESH_IN_2-D;
            ELSE BEGIN
                APPLY NR AND ES;
                UPDATE_DATA_STRUCTURE;
                UNIFORM_MESH_IN_2-D;
            END;{* ELSE *}
        END;{* ELSE *}
    END;
END;{* UNIFORM_MESH_IN_2D *}
```

MESH GENERATION WITH QUASI-EQUILATERAL TRIANGULATION FOR FINITE ELEMENT ANALYSES

BACKGROUND OF THE INVENTION

The field of the invention pertains to computer generation of two-dimensional triangular meshes for finite element analyses. Triangular meshes are also used for the representation of planar surfaces for graphics, image processing and computer vision, for example. In particular, the invention pertains to improvements in triangular mesh generation to eliminate the need for human intervention to improve the shape of the mesh.

Computers have been used widely to automate the processes of design and manufacturing (Computer Aided Design and Computer Aided Manufacturing, or CAD/CAM). Engineers use CAD/CAM to create designs, to analyze the objects and to manufacture the objects. CAD/CAM is based, in part, on the use of geometric modelers which can be used to represent most engineering objects and to manipulate the parts of the objects using modeling operations which simulate design and manufacturing processes.

Geometric modelers are also used in the interface stage between design and analysis. These modelers transform the object in the design stage into the input form of the analysis stage. They do this by generating a mesh which discretizes an object into finite elements. These individual elements are analyzed using a numerical procedure which is known as the finite element method. In this method an object can be thought of as composed of a finite number of elements, each of which can be analyzed separately according to the laws of physics.

Systems of equations can be applied to the finite elements and the solutions to these equations provide an approximate solution to a class of engineering problems called boundary-value problems. Computations of most mechanical properties can be formulated as boundary-value problems. Examples include stresses, strains, deformations, velocities and reactive forces of solid structures and machine components. An important step of the finite element method is the mesh generation based on the boundary description of the object. The accuracy of the analysis depends on the quality of the generated mesh.

Since a mesh is a discrete approximation of the interior of an object, it is important that the difference between the actual object and its meshed representation be as small as possible. Until fairly recently meshes were generated manually, however, computer programs and algorithms for mesh generation have been developed to automate the mesh generation process. After mesh generation, most of these algorithms use an interative smoothing process to relocate nodes of the mesh such that elements with small angles are removed. Even with the smoothing process, none of these algorithms provide a guaranteed lower bound of the smallest angle in the mesh, and human intervention may sometimes be required to improve the mesh. Since the error in the finite element analysis is known to be inversely proportional to the smallest angle in a mesh, a guarantee on the lower bound of the smallest angle is very important for practical applications of finite element analysis.

A paper by L. Paul Chew entitled "Guaranteed-Quality Triangular Meshes" Department of Computer Science, Cornell University, Ithaca, N.Y., TR 89-983, April 1989 discloses triangular mesh generation based upon the Delaunay triangulation method and further constraining the triangulation to accommodate prespecified edges. The paper sets forth the preconditions necessary for the algorithm and a modified algorithm that substantially improves the worst case run time for the algorithm. According to the paper, the preconditions prescribe a set of data points and data edges where no two data points are closer than h (an arbitrarily selected length) and all data edges have lengths between h and the square root of three multiplied by h. The final triangulation produced by the algorithm satisfies the following additional properties. The angles in each mesh triangle are guaranteed to be between 30° and 120° and all edge lengths to be between h and 2h. However, the Chew algorithm does not function when the above preconditions are not satisfied.

SUMMARY OF THE INVENTION

Incorporated by reference herein is the doctoral dissertation by the applicant entitled "Mesh Generation With Quasi-Equilateral Triangulation", to be published in August 1991 at The University of Michigan.

The new meshing algorithms for two-dimensional uniform and graded finite element meshes comprise four new operators applied in the iterative generation of triangular meshes. Using the operators new nodes are generated on the boundary as well as in the interior of an object. These nodes are used to generate a triangular mesh with a desired density. The algorithms generate triangular meshes which guarantee a lower bound for the smallest angle in the whole mesh. With this guaranteed lower bound, it is not necessary to perform smoothing processes on the mesh. Human intervention after generation of the initial mesh to improve its shape also becomes unnecessary. A guaranteed lower bound of 30° is used. Objects with unusually pointed boundaries of less than 30° can be meshed with the new algorithms leaving only the element with the sharp point having an angle less than 30°.

The meshing algorithms start from a rough triangulation which is done with only the vertices of the object. The mesh is refined by adding nodes one by one until the desirable density of the mesh is obtained.

DESCRIPTION OF THE DRAWINGS

FIGS. 1a and 1b illustrate a non-convex object and a triangulation of the non-convex object respectively:

FIG. 2 illustrates the data structure used in the implementations;

FIGS. 7a, 7b and 7c illustrate the action of the node-relocation operator NR and as appropriate combined with the ES operator;

FIG. 8 is a chart of the four new operators;

FIG. 9 illustrates a program in pseudo-code of the meshing algorithm in two-dimensions;

DESCRIPTION OF THE PREFERRED EMBODIMENTS

Figure 3:
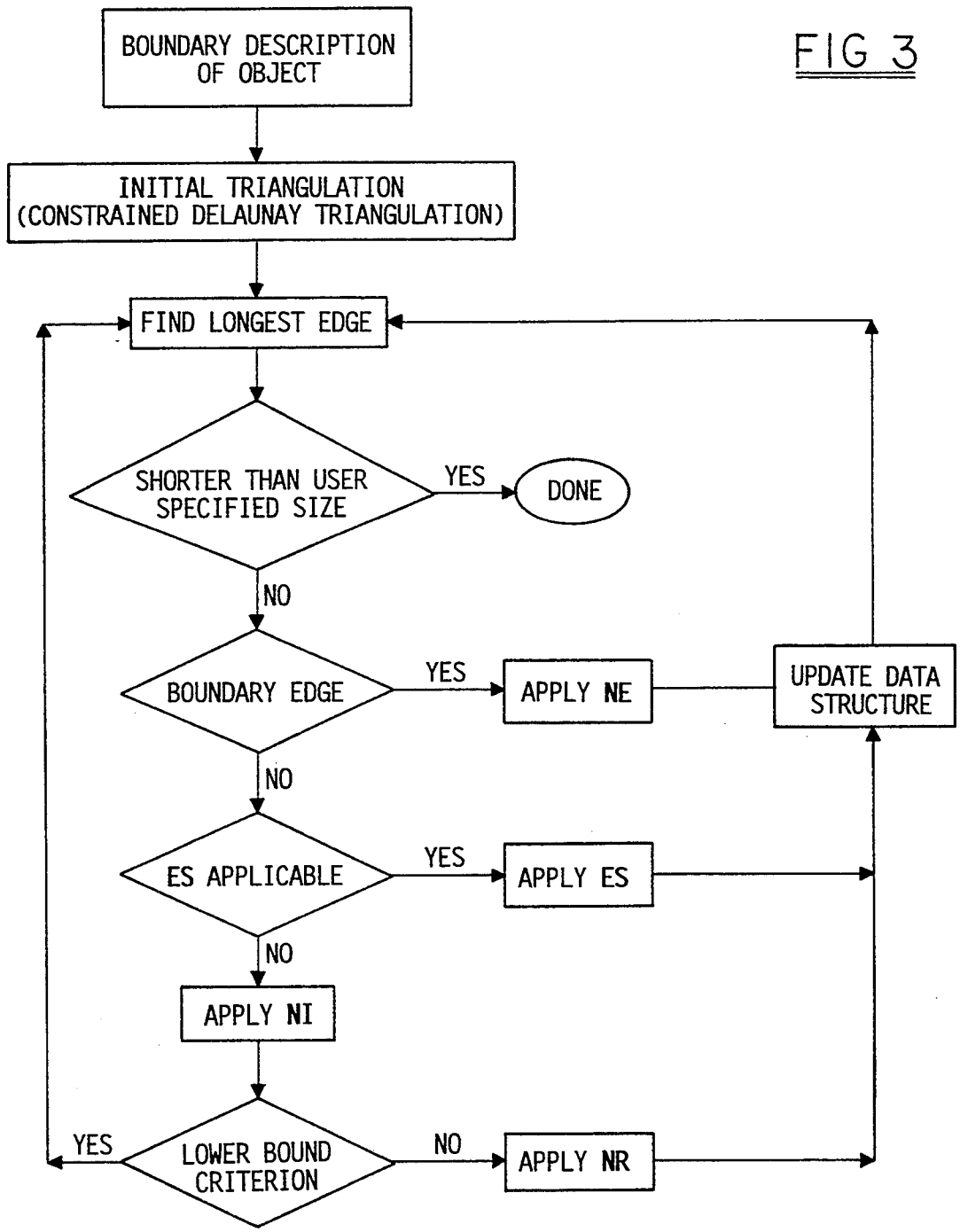
FIG. 3 is a flow chart of the uniform meshing algorithm.

The two-dimensional meshing algorithms identified and disclosed below have been implemented with THINK Pascal language on an Apple Macintosh computer. Other suitable languages and computers may clearly be substituted and adapted for specific applications in finite element analyses.

The uniform and graded mesh algorithms each consist of three units: the data input unit, the initial triangulation unit and the algorithm application unit. The new mesh generation system is applicable to any polygonized objects both simple and non-simple. The object to be meshed is described by its boundary which can be represented by a series of loops. In the input data unit the input to the system consists of the number of loops and the integer coordinates of the vertices for each loop. Each loop of the object should be oriented in either a clock-wise or a counter clock-wise direction.

In order to determine the interior of the object defined by the loops, a point inclusion test is performed. For example, if an infinite ray, from a point to a certain direction intersects with the object an even number of times, the point is outside the object. Otherwise, the point is inside the object. Thus, elements inside a hole or a concave region are deleted.

In the second step, the initial triangulation unit, the object is triangulated using only the vertices of the object. Although any triangulation method can be used for this initial triangulation, Delaunay triangulation has been selected because it is known to maximize the minimum angle of the triangulation when a point set is given. However, to be generally applicable to objects with holes or non-convex boundaries, the method has been modified to Constrained Delaunay Triangulation in the initial triangulation. This constrains the calculation of angles to those lying within the object for objects with non-convex boundaries or holes. FIGS. 1a and 1b illustrate a non-convex object 20 and a triangulation 22 of the non-convex object.

In the third step, the algorithm application unit, a linked list of triangles is constructed. In each triangle, there is a linked list of edges which have a record of two points. Whenever an edge is invoked, one or two triangles which share the edge are identified. Illustrated in FIG. 2 is a sketch of the data structure showing an object, the triangles and further breakdown into edges and vertices used in the implementation.

In the algorithm application unit, two kinds of meshing algorithms have been implemented: the uniform meshing algorithm and the graded meshing algorithm. In the uniform meshing algorithm, the meshing operation continues until the length of the longest edge in the mesh is shorter than a user-defined element length. In the final resulting mesh every edge length is shorter than the user-defined element length. In the graded mesh algorithm, operators to be defined below are applied only for the edges of triangles which do not satisfy the lower bound criterion (for example, the smallest angle greater than 30°). The application of the operators continues until every element satisfies the lower bound criterion.

Figure 4:
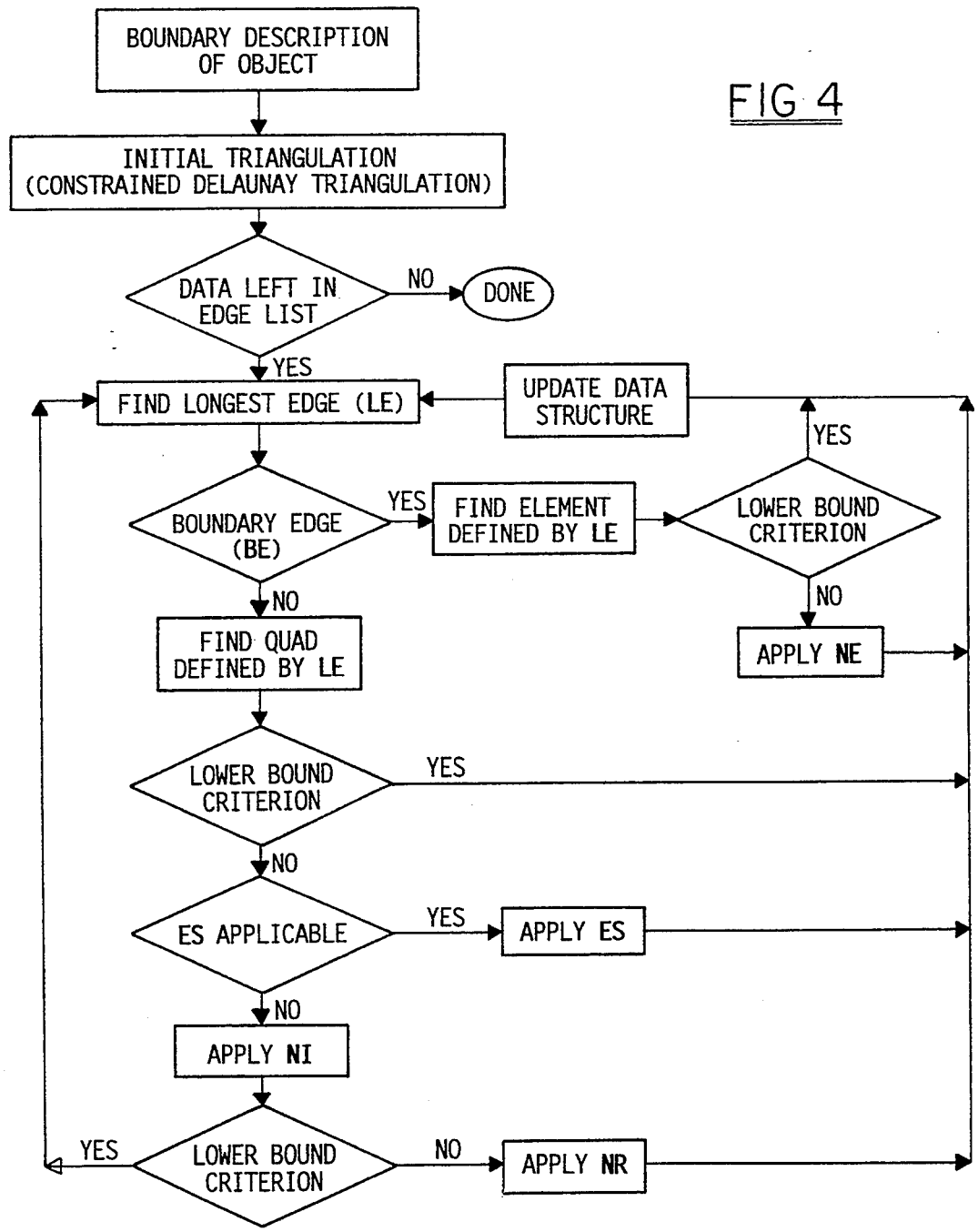
FIG. 4 is a flow chart of the graded meshing algorithm.

Illustrated in FIGS. 3 and 4 are the flow charts of the uniform meshing algorithm and the graded meshing algorithm, respectively. The four new basic operators for node planting and triangulation in two dimensions are Node-on-Edge (NE), Node-in-Interior (NI), Edge-Swapping (ES), and Node-Relocation (NR). In addition, QUAD signifies a convex quadrilateral formed of two triangles having the longest edge as a common edge and LE is the longest edge. Thus, the LE of a QUAD must be an interior edge. BE is a boundary edge.

Operator NE finds a boundary node location and completes the triangulation thus in pseudo-code:

```
Procedure NE
Begin
    If LE = BE then bisect the angle which faces LE
End *NE*
```

Figure 5A:
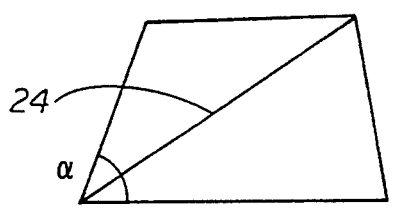
FIGS. 5a and 5b illustrate the action of the node-in-interior operator NI.
Figure 5B:
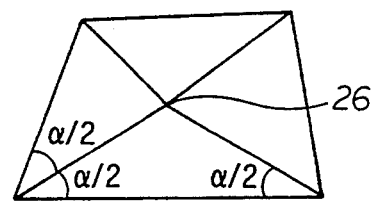

Operator NI finds an interior node location and completes the triangulation. FIG. 5a illustrates a quadrilateral having the LE as the Interior Edge (IE) 24. FIG. 5b illustrates the action of operator NI to locate the interior node 26.

```
Procedure NI
Begin
    If LE = IE then
        Find PCP with one-half of smallest angle in the
          QUAD.
End *NI*
where PCP (interior node) is the apex of the largest isosceles
triangle with one-half the smallest angle as base angles within the
quadrilateral element.
```

Figure 6A:
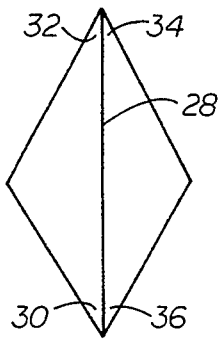
FIGS. 6a and 6b illustrate the action of edge-swapping operator ES.
Figure 6B:
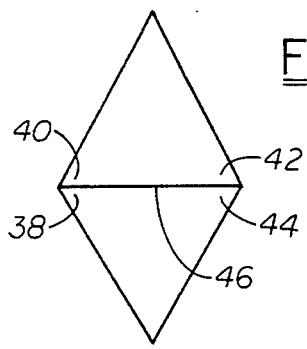

Operator ES improves the mesh quality by swapping an interior edge. FIG. 6a illustrates a quadrilateral wherein LE=IE 28 and the minimum of angles 30, 32, 34, 36 is less than the minimum of angles 38, 40, 42, 44 to either side of interior edge 46 in FIG. 6b as a precondition to ES.

```
Procedure ES
Begin
    If LE = IE and the above precondition is met then
        Swap diagonal in QUAD
End *ES*
```

Operator NR finds a new node location when NI fails to increase the smallest angle in the QUAD. Illustrated in FIG. 7a is a result of NI wherein $\theta$ is less than 30° in triangle TT. Application of NR results in the relocation of interior node 48 in FIG. 7a to the new location in FIG. 7b. Subsequent application of ES eliminates the 15° angle in FIG. 7b to give the triangulation shown in FIG. 7c.

```
Procedure NR
Begin
    If NI does not enlarge the smallest angle in the
```

-continued
```
    QUAD then
        Find the intersection between
        perpendicular bisection line of the
        Top-Edge of TT and 30° supporting
        line of Bottom Edge of BT.
    Else
        Begin
            Find second LE
            LE: = Second LE
        End
End *NR*
```

If after applying NR, triangles which do not satisfy the lower bound of 30°, occur, then apply ES.

FIG. 8 illustrates in chart form the relationship of the four new operators. The application of the respective operators adds nodes, edges and elements to the boundary (B) and interior (I) as shown. The validity of the triangulation can be checked by calculations based on the number of operator applications applied.

Illustrated in FIG. 9 is a program in simplified language to illustrate the uniform meshing algorithm. As indicated the element size is defined by the specified edge length selected by the user. The lower bound of the smallest angle produced by the above algorithm is the minimum of 30° or the smallest angle in the object. The time required in applying one of the four operators for the above algorithm is $0((n+N)\log(n+N))$ and the space requirement is $0(n+N)$ where n is the number of vertices in an object and N is the number of nodes planted.

The algorithm for the graded mesh or mesh with varying densities is directed to automatically provide finer meshes in narrower regions or regions of the object where short edges exist. The detection of these regions can be done by capturing the proximity information of the object geometry. Computation of the proximity information automatically and completely is the key to the automatic graded meshing algorithm. The four operators above disclosed are suitable for finding the proximity information.

Delaunay triangulation is known to have the property that it maximizes the minimum angle when there is a given points set. It can be shown that if a QUAD is not ES applicable, it is a Delaunay triangulation. Therefore, it can be noted that there is a near proximity (small or narrow region) in the region where ES does not generate the lower bound. For a given object, a graded mesh can be achieved if nodes are inserted in the QUADs in which ES is not applicable.

The steps for a graded mesh are as follows:

Step 1: Find the LE in the mesh. If the LE is shorter than the pre-defined shortest edge length, stop. Otherwise, continue.

Step 2: If the LE defines a QUAD with the smallest angle greater than or equal to 30°, delete the LE from the data structure and go to Step 1. Else if the LE defines a QUAD with the smallest angles less than 30°, apply one of the four operators and go to Step 1. Else if the LE defines an acute non-QUAD (a quadrilateral in which the LE is not the longest edge in the quadrilateral region), find the LE in the non-QUAD and go to Step 2.

This approach will always produce a mesh with a desirable density because the element with the LE in the mesh is found first.

Figure 10A:
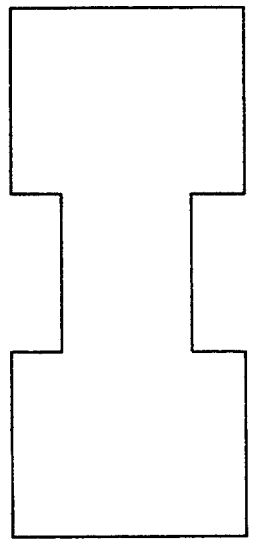
FIGS. 10a, 10b and 10c illustrate a non-convex polygon object, initial triangulation of the object and final triangulation of the object.
Figure 10B:
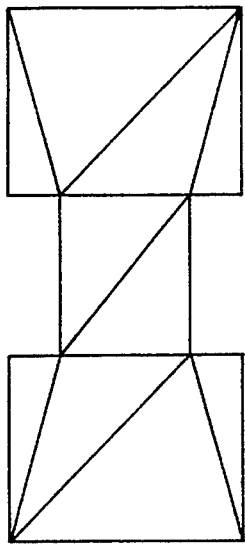
Figure 10C:
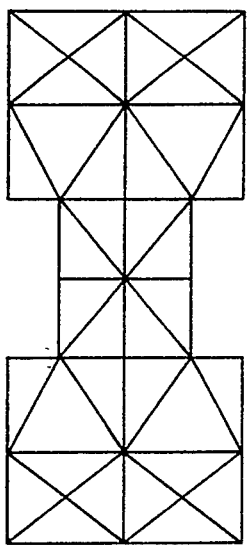
Figure 11A:
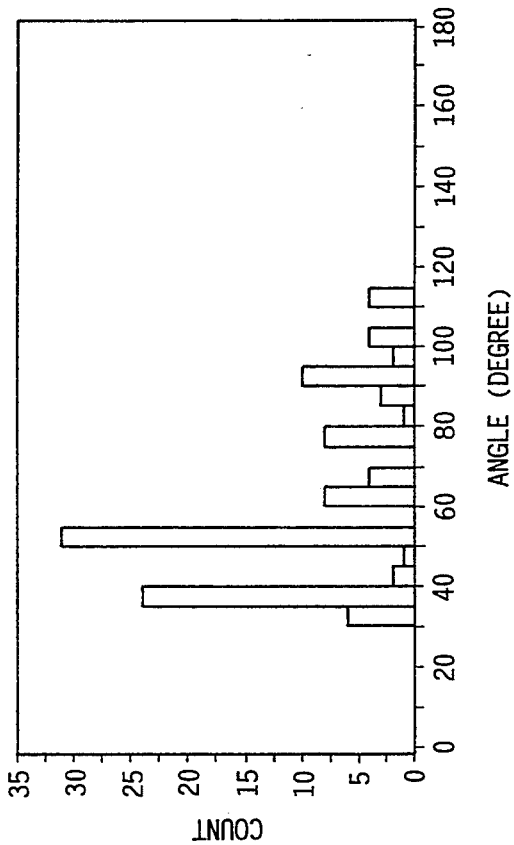
FIGS. 11a and 11b are histograms of the element angles for the meshed object in FIG. 10.
Figure 11B:
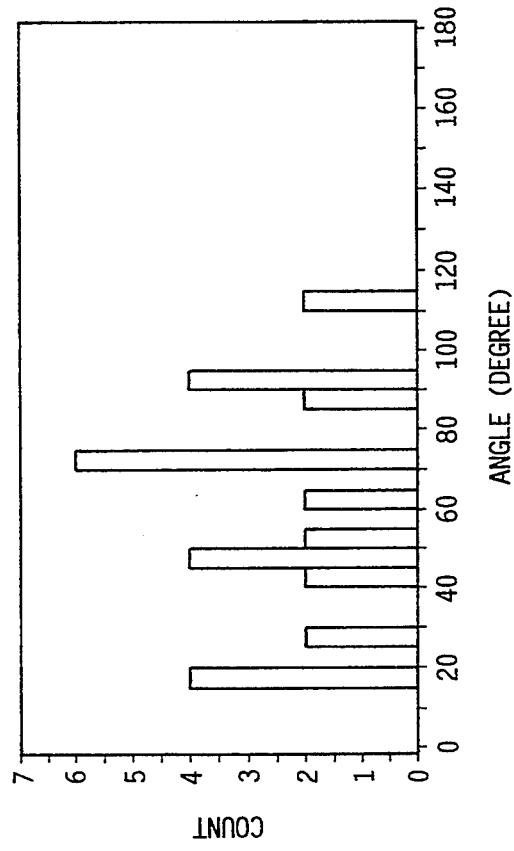

FIGS. 10a, 10b and 10c illustrate the uniform meshing of a non-convex polygon with the initial object shown in FIG. 10a, the initial triangulation shown in FIG. 10b and a final triangulation in FIG. 10c after the application of the new uniform meshing algorithm. FIGS. 11a and 11b illustrate by histogram the numbers of element angles in degrees after the initial triangulation and after application of the uniform meshing algorithm.

Figure 12A:
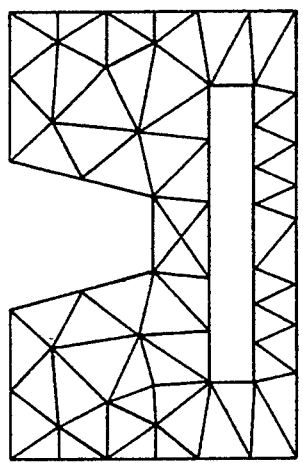
FIGS. 12a, 12b and 12c illustrate a non-convex polygon object with a hole, initial triangulation of the object and final triangulation of the object.
Figure 12B:
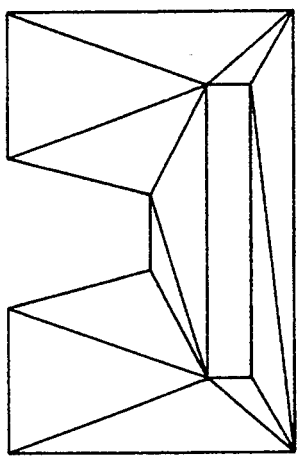
Figure 12C:
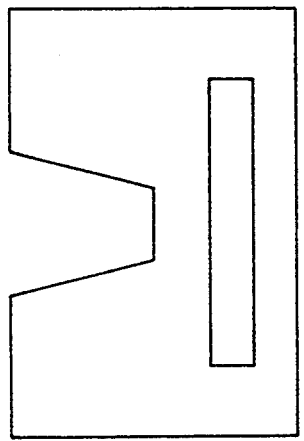
Figure 13A:
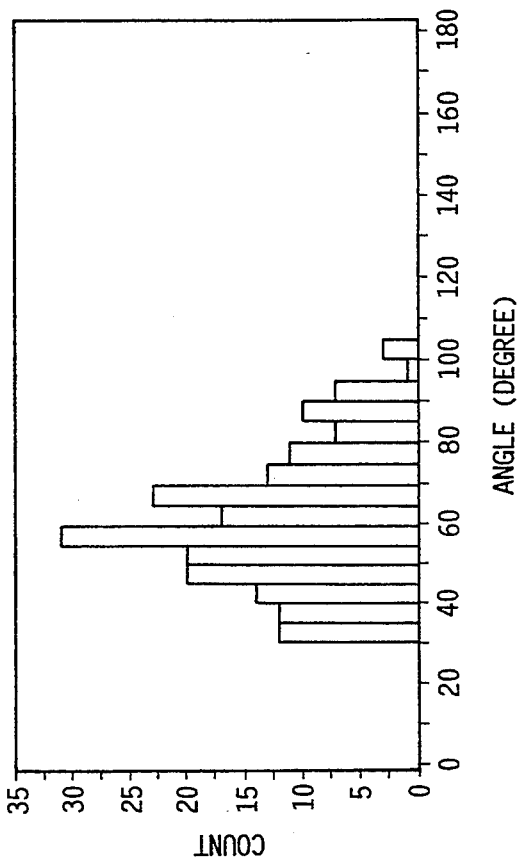
FIGS. 13a and 13b are histograms of the element angles for the meshed object in FIG. 12.
Figure 13B:
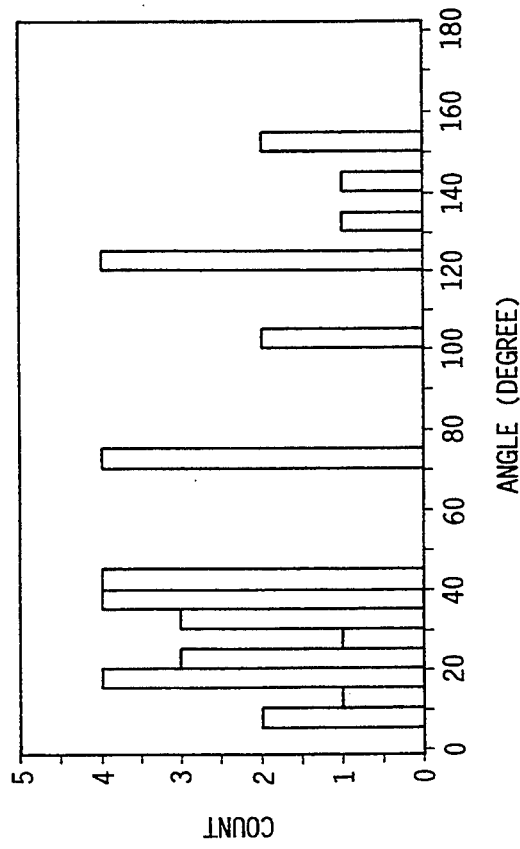

As a second example FIGS. 12a, 12b and 12c illustrate the application of the uniform meshing algorithm to a non-convex polygon with a hole. As above FIG. 12a illustrates the object, FIG. 12b illustrates the initial triangulation and FIG. 12c illustrates the final triangulation after application of the new uniform meshing algorithm. The difference between the initial meshing in FIG. 12b and the final meshing in FIG. 12c is striking in this example. The histograms shown in FIGS. 13a and 13b for this example further emphasizes the improvement in meshing accomplished by the new algorithm and the lower bound criterion of 30° for the angles in the elements.

Figure 14C:
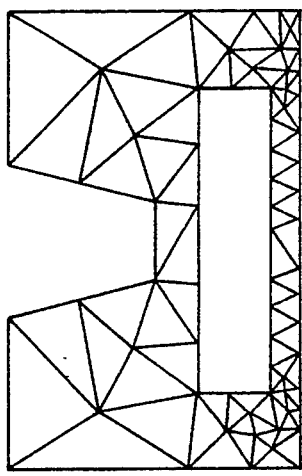
FIGS. 14a, 14b and 14c illustrate a non-convex polygon object with a hole, initial triangulation of the object and final graded triangulation of the object.
Figure 14B:
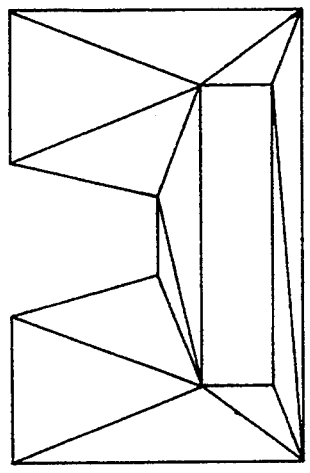
Figure 14A:
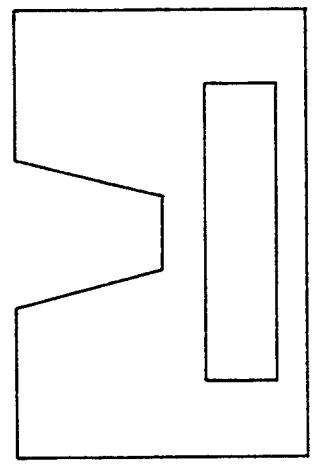
Figure 15B:
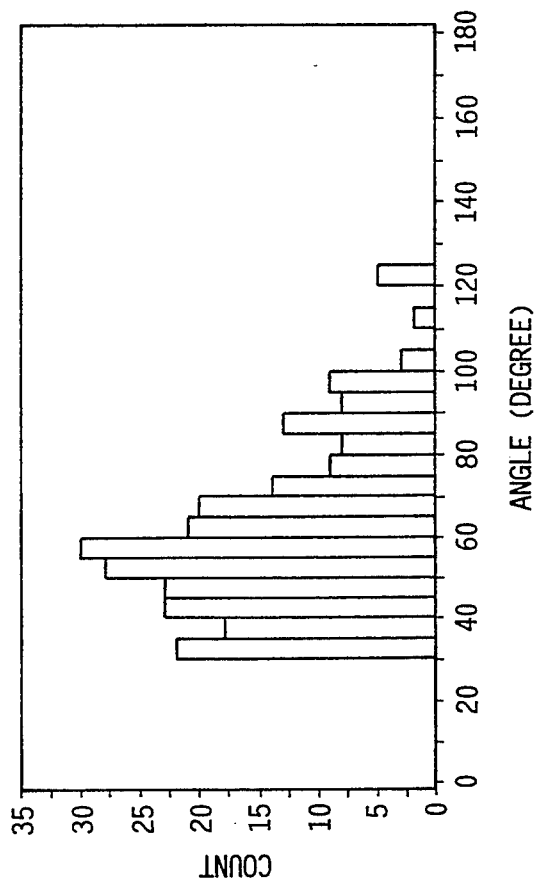
FIGS. 15a and 15b are histograms of the element angles for the meshed object in FIG. 14.
Figure 15A:
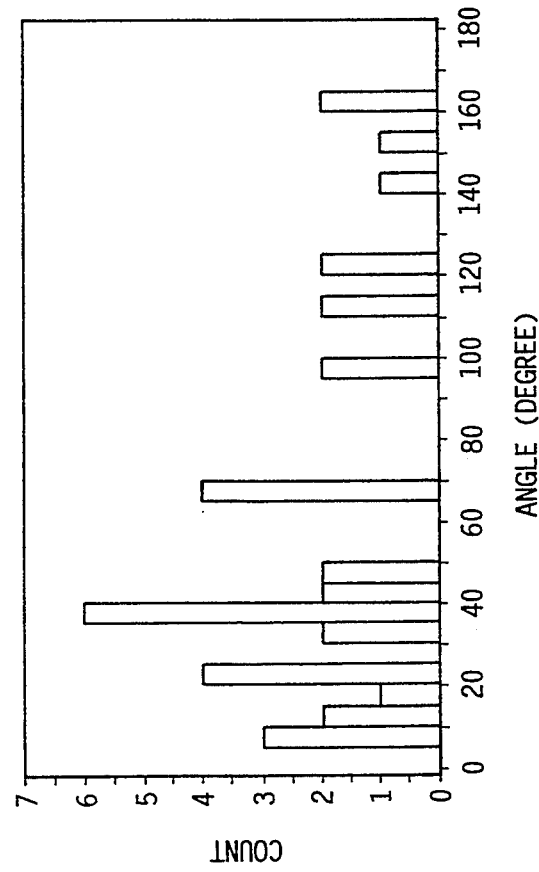

As a final example FIGS. 14a, 14b and 14c illustrate the application of the graded meshing algorithm to a non-convex polygon with a hole. Although the initial triangulation in FIG. 14b is like the initial triangulation in FIG. 12b, the graded meshing algorithm provides a much finer mesh in the narrowest portion of the polygon and areas adjacent thereto. The histograms in FIGS. 15a and 15b illustrate the improvement in element angle distribution between the initial triangulation in FIG. 14b and after application of the graded mesh algorithm in FIG. 15c.

I claim:

1. In combination with a computer having means to read, interpret and execute a program and a program therein having means to accept data input and means to perform an initial meshing triangulation for finite element analysis of polygonal two-dimensional objects,
    meshing means having embedded therein at least one operator selected from a group of operators node-on-edge, node-in-interior, edge-swapping and node-relocation, said meshing means always including the operator node-in-interior, where:
    node-on-edge finds a boundary node location and triangulates an element adjacent the boundary,
    node-in-interior finds an interior node location within a quadrilateral and triangulates the quadrilateral,
    edge-swapping improves a mesh quality by swapping an interior edge of a quadrilateral for the other interior edge of the quadrilateral, and
    node-relocation finds a new interior node location within a quadrilateral when node-in-interior fails to meet a lower bound criterion.

2. The computer and program of claim 1 including means to find a longest edge in the mesh prior to application of any of the operators to the mesh.

3. The computer and program of claim 2 including means to cease the meshing operation on an object when the longest edge in the mesh is less than a user-defined element length.

4. The computer and program of claim 2 including means to cease the meshing operation on an object when all angles of triangles in the mesh equal or exceed the lower bound criterion for the angles.

5. The computer and program of claim 1 wherein the initial meshing triangulation comprises a Constrained Delaunay Triangulation.

6. A computer implemented method to generate two-dimensional meshes for finite element analysis of polygonal objects comprising the steps of:

inputting a configuration of the polygonal object to the computer, performing an initial meshing triangulation of the object, iteratively applying meshing operators to the meshed object, the meshing operators comprising four operators: node-on-edge, node-in-interior, edge-swapping and node relocation, said node-in-interior being applied at least once, until all triangles of the mesh meet a user specified criterion, where a node-on-edge operator finds a boundary node location and triangulates an element adjacent the boundary, a node-in-interior operator finds an interior node location within a quadrilateral and triangulates the quadrilateral, an edge-swapping operator improves a mesh quality by swapping an interior edge of a quadrilateral, and a node-relocation operator finds a new interior node location within a quadrilateral when node-in-interior fails to meet a lower bound criterion.

7. The computer implemented method of claim 6 wherein the meshing operators comprising the four operators is a uniform meshing algorithm and the user specified criterion is a maximum length for the edges of all triangles in the object mesh.

8. The computer implemented method of claim 6 wherein the meshing operators comprising the four operators is a graded meshing algorithm and the user specified criterion is a minimum angle for all angles of all triangles in the meshed object.

9. The computer implemented method of claim 6 wherein the meshing operators first find a longest edge in the mesh before applying any of the four operators in each iteration.

10. The computer implemented method of claim 6 wherein the initial meshing triangulation comprises a Constrained Delaunay Triangulation.

11. The computer implemented method of claim 6 including the step of identifying one or two triangles which share the edge whenever an edge is invoked, the edge being identified by its end point vertices.

* * * * *